Dec. 23, 1969  F. A. VARAH  3,485,927
SEALING DEVICES

Filed Aug. 12, 1968  2 Sheets-Sheet 1

INVENTOR,
FRANK ALWYN VARAH
BY
Lowe & King
ATTORNEYS

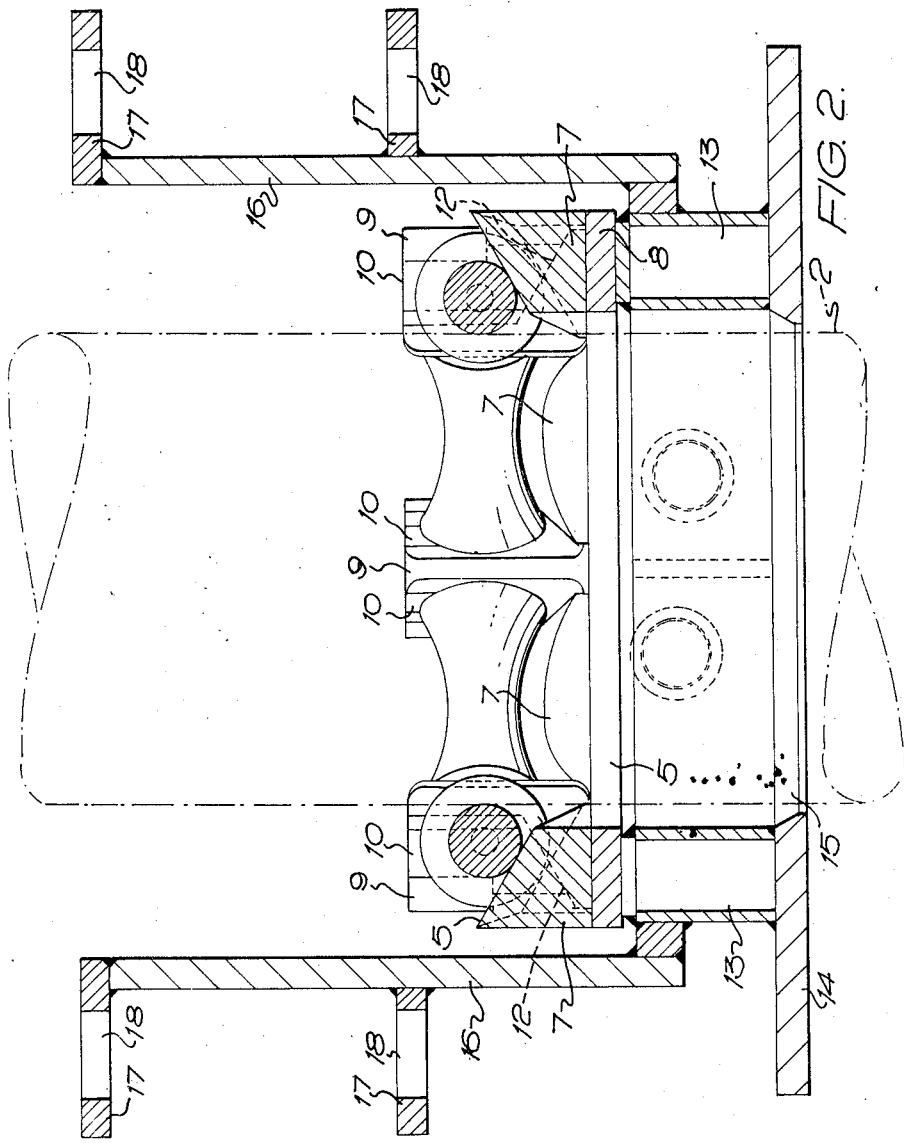

United States Patent Office 3,485,927
Patented Dec. 23, 1969

3,485,927
SEALING DEVICES
Frank Alwyn Varah, Sheffield, England, assignor to Balfour & Darwins Limited
Filed Aug. 12, 1968, Ser. No. 751,942
Int. Cl. H05b 7/10
U.S. Cl. 13—15     10 Claims

ABSTRACT OF THE DISCLOSURE

A device for sealing around an arc furnace electrode or the like has a ring formed by a plurality of rigid rollers placed end-to-end around a mounting having an aperture affording appreciable clearance around an electrode or the like, the rollers being profiled to conform closely to the cross-section of an electrode or like extending through the aperture and seating on surfaces of the mounting complementary in profile to the rollers and inclined downwardly from the outside of the mounting towards the aperture, the mounting also comprising blocks filling the spaces between the ends of the rollers and means for limiting movement of the rollers down the seating surfaces to slightly beyond the positions that the rollers would occupy when in contact with an electrode or the like extending through the aperture.

---

This invention relates to sealing devices, more particularly for around the electrodes of arc furnaces, but also applicable to oxygen and like lances and other appliances similarly depending into a furnace and axially adjustable therein or retractable therefrom.

Known sealing devices for arc furnace electrodes are either very complex and vulnerable to damage of the electrodes or very inefficient. The object of the present invention is to provide a sealing device which is not liable to damage an electrode extending through it and which is comparable—if not better—in efficiency than the known devices.

According to the present invention, a device for sealing around an arc furnace electrode or the like comprises a ring formed by a plurality of rigid rollers placed end-to-end around a mounting having an aperture affording appreciable clearance around an electrode or the like, the rollers being profiled to conform closely to the cross-section of an electrode or like extending through the aperture and seating on surfaces of the mounting complementary in profile to the rollers and inclined downwardly from the outside of the mounting towards the aperture, the mounting also comprising blocks filling the spaces between the ends of the rollers and means for limiting movement of the rollers down the seating surfaces to slightly beyond the positions that the rollers would occupy when in contact with an electrode or like extending through the aperture.

Although there will be only line contact between the rollers and an electrode or like extending through the aperture towards which the rollers are urged by gravity and there is only line contact between the rollers and the seating surfaces, the device is very effective because it does not depend on precise concentricity of the electrode with respect to the aperture, any eccentricity being accommodated by displacement of the rollers up and down the seating surfaces. Any slight gaps between the adjacent ends of the rollers are substantially closed by the blocks filling the spaces between the rollers even allowing for clearance (e.g., about ⅛″) between the rollers and blocks to afford the rollers reasonable freedom of movement.

Conveniently, there are six rollers in the device, keeping the largest diameter of the rollers (at their ends) within comfortable limits, consistent with a sufficient minimum diameter (at their middle or "waists") to ensure adequate strength under all operating conditions, but a smaller or greater number of rollers may be employed—extending round a correspondingly greater or smaller arc—in accordance with appreciably smaller or appreciably greater diameters of electrode or like.

The angle of inclination of the seating surfaces may be selected from a wide range of angles, but it is preferably 30° to the horizontal, resulting in a substantial contact pressure between the rollers and an electrode or like, with considerable freedom for movement of the rollers up the seating surfaces upon displacement of the electrode or like, and without risk of wedging of the rollers between the seating surfaces and the electrodes or like during insertion of the latter.

The means for limiting movement of the rollers down the seating surfaces may comprise spigots on the ends of the rollers and the inner sides of vertical grooves in the blocks between the rollers, the outer sides of the grooves serving also with the spigots to limit movement of the rollers up the seating surfaces, when any one or more of the seating surfaces becomes oppositely inclined during tipping of a furnace, on which the device is fitted, to a maximum of 45°, for slagging or tapping. To avoid accumulation of iron oxide dust in the slots, such as would tend to clog the spigots and lock the rollers, the lower ends of the grooves preferably turn and run out to the outsides of the blocks. No removable closures are required for the upper ends of the grooves because the rollers are retained in position by gravity and, therefore, are readily removable for cleaning or replacement.

The seating surfaces are most conveniently provided on separate blocks secured on a mounting ring (providing the actual aperture) in alternation with grooved retaining blocks providing for filling of the spaces between the ends of the rollers and for restriction of their movement. Suitable materials are stainless steel for the rollers, cast iron for the seating blocks, cast stainless steel for the retaining blocks, and mild steel for the mounting ring. Stainless steel rollers and retaining blocks are used for their non-magnetic and heat resisting properties, the first eliminating generation of heat by eddy currents from the electrodes and the second enabling them to withstand the great heat from the red-hot raised electrodes whilst fettling of the furnace takes place.

One embodiment of the invention will now be described with reference to the accompanying drawings, in which:

FIGURE 2 is a section on line 2—2 of FIGURE 1; and

Figure 1:
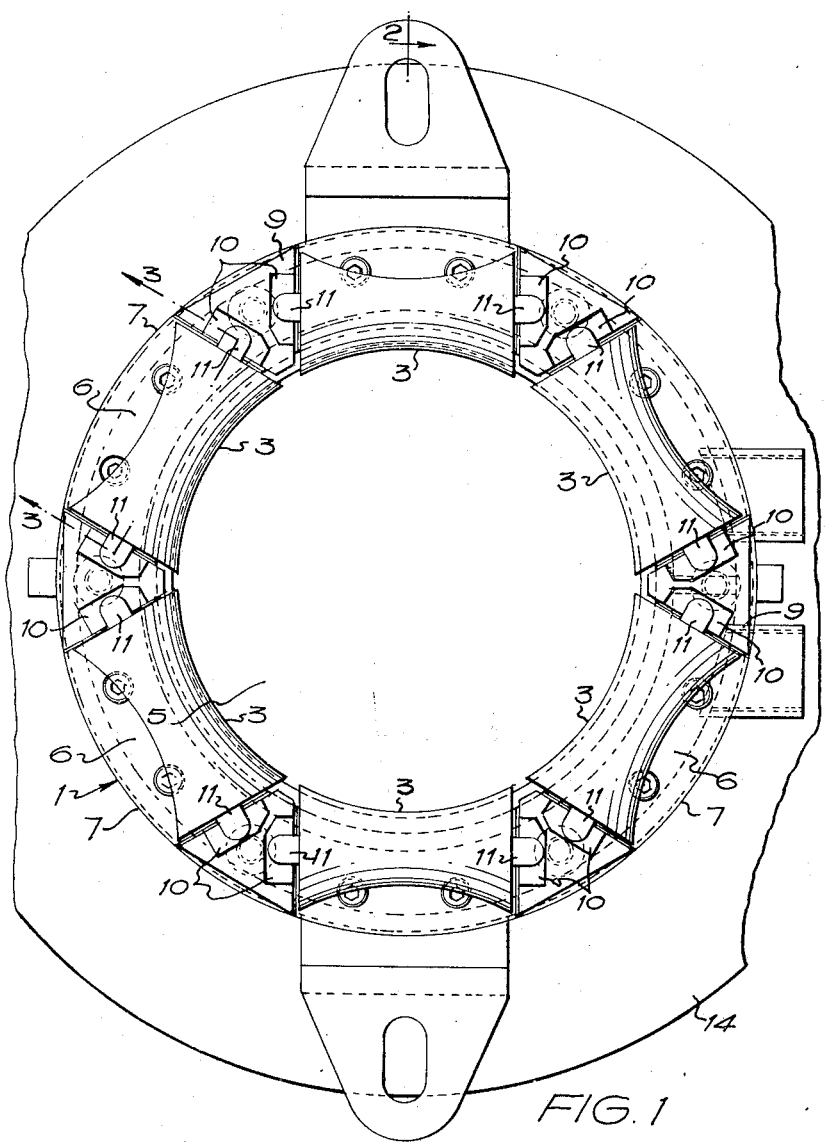
FIGURE 1 is a plan of a sealing device for arc furnace electrodes.
Figure 3:
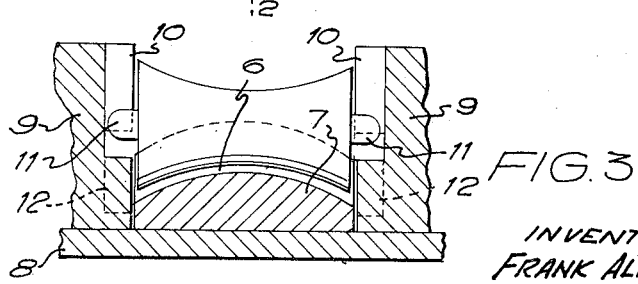
FIGURE 3 is a section on line 3—3 of FIGURE 1.

A sealing device 1 for sealing around an arc furnace electrode 2 has a ring formed by six stainless steel rollers 3 placed end to end round a mild steel mounting 4 having an aperture 5 affording appreciable clearance around the electrode 2. The rollers 3 are each profiled to conform closely to the cross-section of the electrode to provide substantially continuous contact between the rollers and the electrode around the whole periphery of the electrode. Six rollers are provided for the particular electrode 2 shown in order to keep the largest diameter (at the ends) within comfortable limits consistent with a sufficient minimum diameter (at the "waists") to ensure adequate strength under all operating conditions.

The mounting 4 is provided with a seating surface 6 for each roller 3 formed on a block 7 secured to a mounting ring 8, the seating surfaces being inclined downwardly towards the aperture 5 at an angle of 30° to the horizontal, and each seating surface has a shape complementary to that of the rollers. The mounting also has stainless steel blocks 9 secured to the ring 8 and substantially filling the spaces between the adjacent ends of the rollers even allowing the slight clearance that must exist to afford the rollers reasonable freedom of movement on movement of the electrode. The blocks 9 are each provided with two vertical grooves 10, one groove 10 is one block 9 facing the roller 3 to that side of the block, the other groove in that block facing the roller 3 to the other side of that block the rollers 3 having angles 11 lying in the grooves. The grooves end at their lower ends at a position such that the rollers would occupy a position slightly beyond that after the electrode has been inserted in the inner ends 12 of the grooves turning and running to the outside of the blocks 9 to avoid accumulation of iron oxide dust in the slots. The outer ends of the grooves limit the movement of the rollers up the seating surfaces 6, when the seating surfaces became oppositely inclined, e.g., when tipping a furnace to which the seal has been fitted, for slagging or tapping, and no removable closures are required for the upper ends of the grooves because the rollers are retained by gravity and, therefore, readily removable for cleaning or replacement.

The ring 8 forms the top of a box type electrode cooler 13 mounted on a plate 14 with a central aperture 15 for passage of the electrode. The plate 14 rests on the furnace top, and the sealing device 1 is secured to the furnace by way of two diametrically opposite lugs 16 with flanges 17 having holes 18 for any suitable locking means.

Thus, with the device secured to a furnace top, and with no electrode present, the angles 11 on the rollers 3 lie in the bottom of the grooves 10 and therefore the aperture formed by the rollers is less in diameter than the electrode for which the device has been designed. As the electrode is introduced to the furnace, it is pushed past the rollers causing them to ride up the inclined surfaces of the blocks 9 until the rollers are in contact with the sides of the electrodes, where they are held by gravity and while there is only line contact between the rollers and the electrode and between the rollers and the blocks 9, an efficient seal is provided round the electrode, which efficiency is not dependent on precise concentricity of the electrode with respect to the aperture 5, any eccentricity being accommodated by displacement of the rollers up or down the inclined support face on the blocks.

The provision of an electrode cooler immediately below the sealing device, keeps the rollers 3 and blocks 9 cool and, therefore, the electrode 2 cool also from the device upwards. The sealing device also prevents fierce flame impingement on the electrode from the device upwards, thus greatly reducing erosion of the electrode and reducing electrode consumption per ton of steel produced, while being capable itself of withstanding severe flame attack. Furthermore, the device is very efficient because it provides a positive seal which is self-adjusting, it is very reliable because it is not affected by heavy accumulation of dust and will not damage the electrode, and its simple construction makes it easy to manufacture and to fit to existing arc furnaces.

What I claim is:

1. A device for sealing around an arc furnace electrode or the like, comprising an apertured mounting affording appreciable clearance around an electrode or the like, a ring on the mounting, the ring being formed by a plurality of rigid rollers disposed end-to-end, and the rollers having a profile to conform closely to the cross-section of an electrode or the like extending through the apertured mounting, seating surfaces on the mounting complementary in profile to the rollers and inclined downwardly from the outside of the mounting towards the inside, blocks on the mounting between the ends of the rollers, and means on the blocks for limiting movement of the rollers down the seating to slightly beyond the positions that the rollers would occupy when in contact with an electrode or the like extending through the apertured mounting.

2. A sealing device as in claim 1, wherein the means for limiting movement of the rollers down the seating comprises grooved blocks between the rollers, and axles on the ends of the rollers engaging the grooved blocks, the grooved blocks also serving to limit movement of the rollers up the seating.

3. A sealing device as in claim 2, wherein the grooved blocks are such that the grooves at the lower end of the block turn and extend to the outside of the block.

4. A sealing device as in claim 1, wherein the rollers are retained in position by gravity.

5. A sealing device as in claim 1, wherein the sealing surfaces of the rollers are on separate blocks secured to the mounting ring in alternation with grooved retaining blocks extending between the rollers.

6. A sealing device as in claim 5, wherein the sealing blocks are of cast iron.

7. A sealing device as in claim 5, wherein the rollers are of stainless steel.

8. A sealing device as in claim 5, wherein the grooved retaining blocks are of cast stainless steel.

9. A sealing device as in claim 5, wherein the mounting ring is of mild steel.

10. A sealing device as in claim 1, wherein lugs are provided on the sealing device to enable the sealing device to be secured to a furnace.

References Cited

UNITED STATES PATENTS

| | | | |
|---|---|---|---|
| 1,363,815 | 12/1920 | Saklatwalla et al. | 13—16 |
| 1,732,431 | 10/1929 | Bruggmann | 13—17 |
| 2,802,041 | 8/1957 | Bramlett et al. | 13—17 |
| 2,906,799 | 9/1959 | Schlienger | 13—17 |

BERNARD A. GILHEANY, Primary Examiner

H. B. GILSON, Assistant Examiner

U.S. Cl. X.R.

13—14